H. S. PIERCE.
MEANS FOR LUBRICATING CHAIN DRIVES.
APPLICATION FILED SEPT. 5, 1914.
1,231,424.
Patented June 26, 1917.
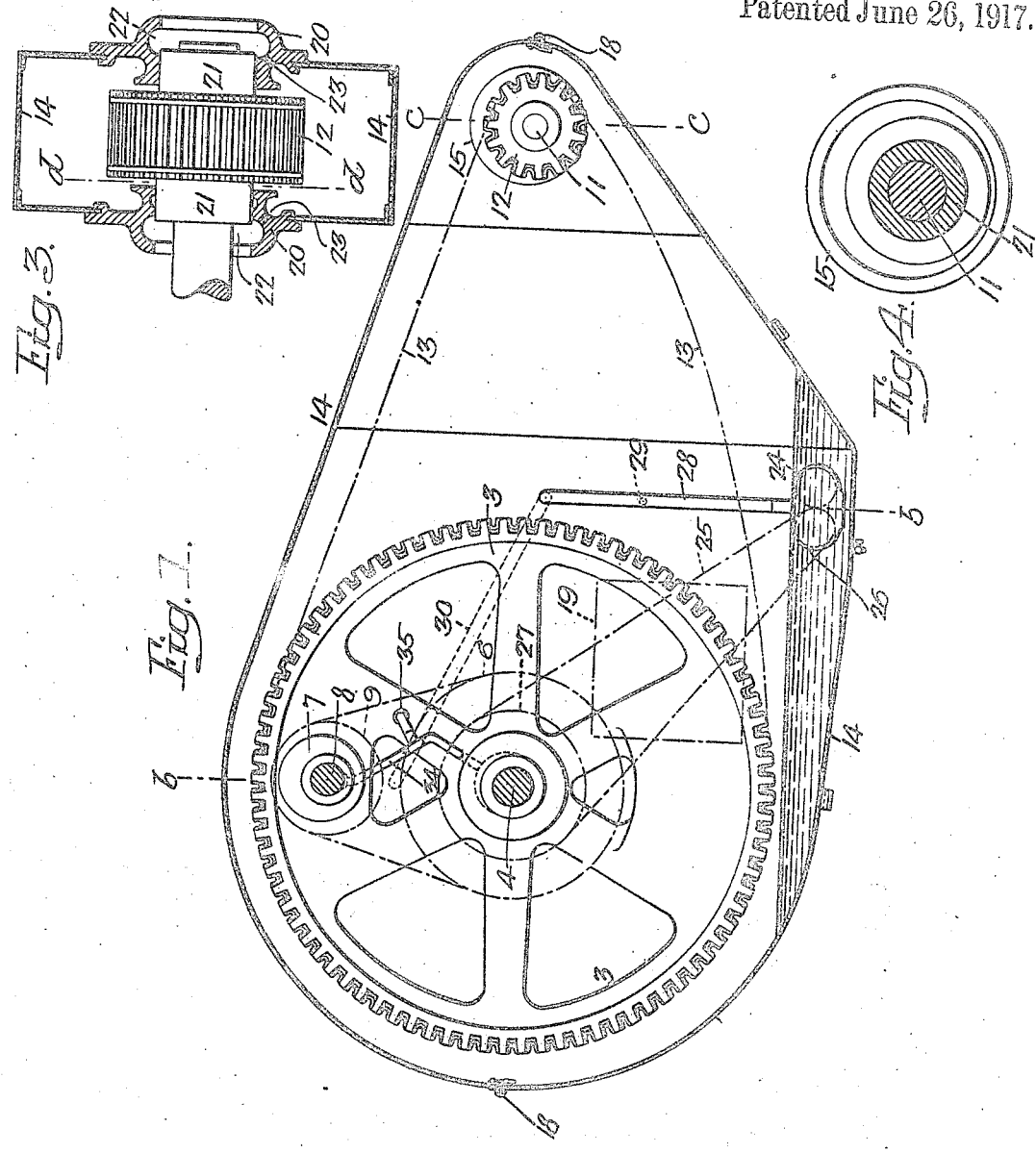
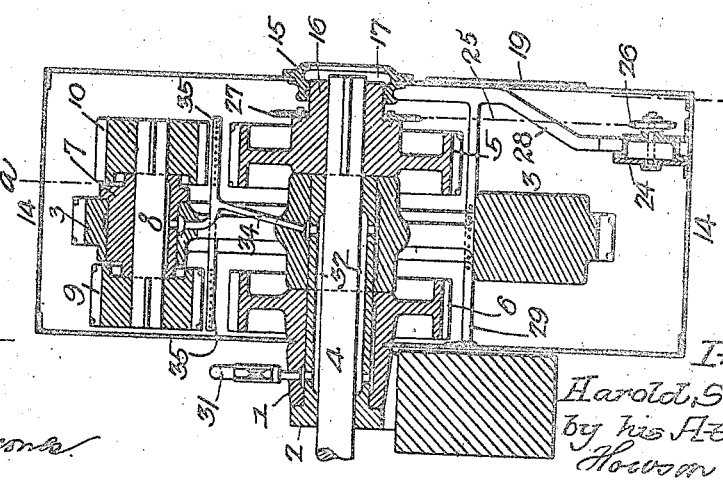

UNITED STATES PATENT OFFICE.

HAROLD S. PIERCE, OF PHILADELPHIA, PENNSYLVANIA, ASSIGNOR TO LINK-BELT COMPANY, OF CHICAGO, ILLINOIS, A CORPORATION OF ILLINOIS.

MEANS FOR LUBRICATING CHAIN DRIVES.

1,231,424.  Specification of Letters Patent.  Patented June 26, 1917.

Application filed September 5, 1914. Serial No. 860,416.

*To all whom it may concern:*

Be it known that I, HAROLD S. PIERCE, a citizen of the United States, residing in Philadelphia, Pennsylvania, have invented certain Improvements in Means for Lubricating Chain Drives, of which the following is a specification.

The object of my invention is to provide means for positively lubricating the bearings of chain driving mechanism and to provide means whereby a continuous circulation of the oil, or other lubricant, is maintained while the mechanism is in motion.

In the accompanying drawings:—

Figure 1, is a longitudinal sectional view on the line $a$—$a$, of Fig. 2, illustrating my invention;

Fig. 2, is a transverse sectional view on the line $b$—$b$, Fig. 1;

Fig. 3, is a sectional view on the line $c$—$c$, Fig. 1; and

Fig. 4, is a sectional view on the line $d$—$d$, Fig. 3, showing the eccentric washer.

Referring to the drawing, 1 is a bearing secured to any suitable support. 2 is a sleeve extending through the bearing and projecting at one end thereof, and supported by this sleeve is the main sprocket wheel 3. 4 is a shaft which extends through the sleeve 2 and projects beyond the sleeve a sufficient distance to carry the sprocket wheel 5. The bearing 1 has a fixed sprocket wheel 6. In the present instance, mounted in the main sprocket wheel 3, near its periphery, is an eccentric bearing 7 for a shaft 8. On one end of the shaft is a sprocket wheel 9 and on the opposite end is a sprocket wheel 10. The sprocket wheels 9 and 10 are in line with the sprocket wheels 6 and 5, respectively, and chains pass around these two sets of wheels.

11 is a shaft mounted in suitable bearings and on which is a sprocket wheel 12. Passing around this sprocket wheel and the large sprocket wheel 3 is a chain 13 shown by dotted lines in Fig. 1.

14 is a casing inclosing the several sprocket wheels, including the sprocket wheel 12 on the shaft 11, and one side of the casing fits in a groove in the bearing 1 and in the opposite side is an opening in which is mounted a ring 15 which has a bearing upon the extended portion 16 of the hub of the sprocket wheel 5. This ring has an annular groove 17 which communicates with the interior of the casing through a hole at the base, so that any oil passing through the space between the ring and the extended portion of the hub will be collected in the groove and will be returned to the interior of the casing. The casing is made in two parts divided on the center line of the shaft and may be secured by hinged pintles 18 at each end. There is a door at one side, as at 19, so that access may be had to the interior of the casing without removing it entirely from the mechanism.

In order to take up the wear of the chain 13, the shaft 11 is made adjustable to and from the main shaft 4, and to accommodate this adjustment I provide eccentric collars 20, as shown in Figs. 3 and 4, which are mounted in the casing and enter the grooves in the collars, as shown. In the present instance, the sprocket wheel 12 has a hub 21 which extends into the openings in the collars 20. These openings are located eccentrically with respect to the periphery of the collars so that, when it is desired to take up the slack on the belt 13, the collars can be turned to accommodate any longitudinal movement of the shaft 11 to and from the shaft 4. The collars are provided with internal annular grooves 22 to collect any oil which may escape through the bearing and these grooves are connected by passages 23 with the interior of the casing.

In order to circulate the oil in the casing, I provide a pump 24, of any suitable type, which is located in the bottom of the casing and, in the present instance, this pump is a gear pump and one of the gear members is driven from the main shaft by a sprocket chain 25, which passes around a wheel 26 on the pump shaft and a wheel 27 on the hub 16 of the sprocket wheel 5. An outlet pipe from the pump is vertically arranged, as at 28, and has a cross member 29 provided with a series of perforations which spray a certain amount of oil on the teeth of the main sprocket wheel 3. The main pipe 28 is continued and connects with a diagonal pipe 30 which, in turn, connects with a pipe 31 leading to the oil opening in the bearing 1, and this opening communicates with the longitudinal channels 32 in the sleeve 2. In the hub of the wheel 3 is a passage which also communicates with the longitudinal passage 32 and this passage connects with a pipe 34 leading to the bearing 7, which is lubricated as well as the shaft 8. A branch 35 extends transversely under the two sprockets 9 and 10 and these branches are perforated so as to allow a certain amount of oil to be sprayed on the teeth of the sprockets or their chains.

Thus it will be seen that by providing a certain amount of oil in the base of the casing 14 it is circulated through the bearings and is sprayed directly upon the teeth of each of the sprocket wheels, or their chains, so as to thoroughly lubricate all parts without having the sprockets submerged in oil.

I claim:—

1. The combination in chain gearing, of a bearing; a shaft mounted in the bearing; a sprocket wheel on the bearing; a second shaft and sprocket wheel; a chain passing around both sprocket wheels, the bearing having oil passages therein so as to lubricate the shaft and communicating with the space between the sprocket wheel and the bearing; a casing inclosing the said mechanism and arranged to contain oil in the bottom thereof; a pump arranged to draw oil from the bottom of the casing; means for operating said pump and a pipe leading from the pump to the bearing so that the oil will circulate in the casing.

2. The combination of a bearing 1, a sleeve 2 extending through the bearing and projecting at one end thereof, said sleeve having oil passages therein and the bearing having a passage therein communicating with the passages in the sleeve, a shaft 4 mounted in the sleeve and extending beyond the end thereof, a sprocket wheel 6 connected to the bearing, a sprocket wheel 3 on the sleeve, a third sprocket wheel 5 connected to the shaft mounted in the sleeve, a shaft 8 mounted in the wheel carried by the sleeve and located near the periphery thereof, sprocket wheels 9 and 10 on the shaft 8 in line with the sprocket wheels 6 and 5, connected to the bearing and the shaft 4 respectively, a casing inclosing said sprocket wheels and having an oil reservoir at the bottom; a pump in said reservoir; a pipe leading from the pump to the oil passage in the bearings; a pipe leading from the hub of the sprocket wheel carried by the sleeve to the bearing of the shaft carried by the said wheel so as to lubricate said wheel; and spray pipes communicating with the oiling system for spraying oil on said wheel.

In testimony whereof, I have signed my name to this specification, in the presence of two subscribing witnesses.

HAROLD S. PIERCE.

Witnesses:
Jos. H. Klein,
Wm. A. Barr.